United States Patent Office

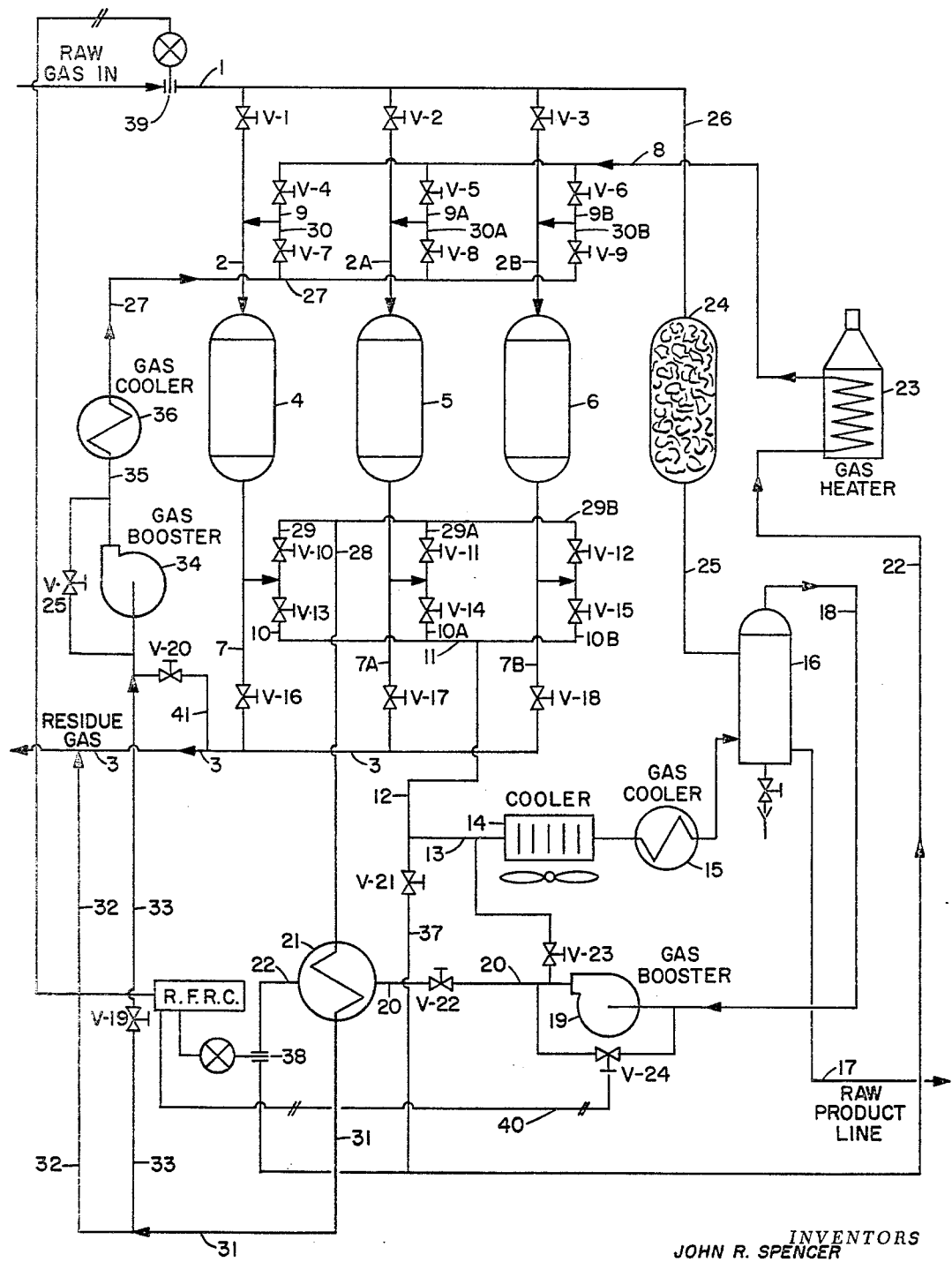

3,479,797
Patented Nov. 25, 1969

3,479,797
SURGE CHAMBER FOR HYDROCARBON
RECOVERY SORPTION SYSTEMS
John R. Spencer, Walton D. Greathouse, and James H. Cheek, Houston, Tex., assignors to Continental Oil Company, Ponca City, Okla., a corporation of Delaware
Filed Aug. 10, 1967, Ser. No. 659,781
Int. Cl. B01d 53/02
U.S. Cl. 55—62                           9 Claims

ABSTRACT OF THE DISCLOSURE

Method and apparatus for removing condensables from gases comprising three adsorber beds sequentially switched to sorption, heating, and cooling circuits. Condensing and liquid collection apparatus are included in the heating circuit to remove vaporized condensables in a heated gas flowing through the bed in the heating circuit. A surge chamber intermediate a conduit connecting the heating circuit and an outside gas source (feed gas or residue gas) accommodates expansion and contraction of gas in the heating circuit. Prior to switching the hot regenerated bed into the cooling circuit, the gas therein is displaced into the spent bed next to be heated.

BACKGROUND OF THE INVENTION

This invention relates to separation of condensable vapor from gas by sorption. In one of its aspects, the invention relates to method and apparatus for reducing pressure surges in regenerating sorbent beds utilized in the sorption system. In another aspect, the invention relates to method and apparatus for retaining a greater portion of regeneration fluid within a closed cycle regeneration loop during cyclic recovery of a condensable vapor from gas by sorption.

SUMMARY OF PRIOR ART

It is known that gasoline, light hydrocarbons and water can be removed from natural gas by sorption. The use of solids to adsorb vaporized condensables, such as hydrocarbons, dates back to an old charcoal process. As used herein, the term, vaporized condensables, or condensables, connotes a readily condensable gas. Gasoline liquids have been recovered in dry bed dehydrators for many years. Present short cycle plants utilize various adsorbents. They also utilize multiple beds to obtain a continuous process, i.e., one or more beds are adsorbing while one or more beds are being regenerated and cooled. Most of the processes use heated gas to regenerate the spent bed followed by cooling of the regeneration gas to condense a portion of the hydrocarbons and water therein. There are two basic types of systems: open or closed circuit regeneration.

In the open circuit system the raw gas flows into the top of the activated adsorbent bed or beds. It passes through and around the adsorbent which adsorbs the heavy hydrocarbons and water from the gas. The residue gas flows out the bottom of the tower, through a heat exchanger and to sales. A portion of the inlet gas is taken for regenerating the bed which has been loaded with hydrocarbon from previous exposure. The regeneration gas passes through a heater; then the hot gas is passed through the loaded bed. This desorbs the heavy hydrocarbons and water which pass out the bottom of the bed as vaporized condensables. The vapor is cooled to condense some of the hydrocarbon and water, which is then removed to recover the hydrocarbon liquid. The remaining gas is returned to the main inlet raw gas stream. After regeneration, valves are switched so that cool gas cools the heated bed. The cool active bed is then switched into adsorption service and an exposed bed is switched to regeneration to complete a cycle.

A closed circuit system operates essentially as the open circuit as far as the main stream of gas is concerned. The regeneration gas, however, is recirculated by means of a mechanical gas pump in a closed circuit. A breather line allows expansion of the regeneration volume as it is heated.

There are several variations of the above systems, but in all cases a large portion of the enriched, cooled regeneration gas that is in equilibrium with the condensed liquid is recycled to another bed by breathing, or is displaced in the residue gas. This loss is replaced by a lean gas which in turn reduces the partial pressure and recovery of the heavy components in the condensing stream. The recycle adds to the load on the beds and reduces capacity and recovery by almost an equal amount. Most of the systems use conventional heat exchangers or aerial coolers to recover heat or cool the residue gas.

When the regeneration of a bed starts, the unadsorbed gas in the void spaces and piping of the bed is near ambient temperature and is primarily low molecular weight compounds, usually methane and ethane. These gases also retard condensation of products during regeneration. This lean gas constitutes the major portion of the gas in the regeneration system. This volume of gas is heated as the regeneration proceeds and must behave, with slight deviation, in accordance with the Ideal Gas Law. The pressure is usually held constant and provision is made for the gas to expand through an equalizer or breather line. If the starting temperature of the bed were 540 deg. R (80 deg. F.) and were heated to 1040 deg. R (600 deg. F.), the volume of gas would expand by a factor of about 1040/540, or 1.93. Adsorbed gases are also evolved from the bed during the heating and contribute to the gas volume that must expand since these products are not all condensed in the cooling system. Practically all of the products carried out of the regeneration system by the expansion are not recovered.

OBJECTS OF THE INVENTION

Accordingly, it is an object of this invention to provide method and apparatus for increasing recovery of condensable vapor from a gas.

Another object of this invention is to provide method and apparatus whereby pressure changes in the sorption system are reduced to a minimum in changing from one cycle to a succeeding cycle.

Still another object of this invention is to provide method and apparatus whereby pressure changes are kept to a minimum in a closed regeneration system during the regeneration of a spent sorbent bed.

Still another object of this invention is to provide method and apparatus for reducing the loss of rich regeneration gas by thermal volume changes in a closed regeneration circuit sorption system.

Other aspects, objects, and the several advantages of the invention will become apparent upon study of this disclosure, the appended claims, and the accompanying figure which is a schematic drawing of one embodiment of this invention permitting a choice of flow paths.

SUMMARY OF THE INVENTION

According to our invention, there is provided method and apparatus for removing vaporized condensables from a gas, such as gasoline components from natural gas, by sorption of said condensables cyclically in one of a plurality of beds of solid sorbent wherein each of said beds of solid sorbent is cyclically regenerated by passage therethrough of a stream of heated regeneration fluid in a closed regeneration circuit, there being provided a surge chamber intermediate a conduit connecting the regeneration circuit and an outside gas source, for example, a stream of raw feed gas preferably, or a stream of stripped residue gas.

PREFERRED EMBODIMENT

As discussed previously a considerable amount of gas expansion occurs in the regeneration circuit during the heating of an adsorbent bed. This expansion is opposed to some extent by the condensation of liquid in the cooling section. The condensation of liquids from the regeneration gas is dependent upon the composition, pressure and temperature of the gas as it passes through the cooling section. The composition of the gas varies as the regeneration proceeds. For example, some of the low molecular weight, more volatile components are evolved early in the regeneration phase, while the heavier components evolve during the last phase of the regeneration. This behavior results in the condensation of gas to liquids being less than the volume of gas evolved from adsorbed condensables in the bed being heated during the first portion of the regeneration. An increase in the total circulating gas volume results. The heavy components evolved during the last portion of the regeneration are more favorable to condensation. This results in the condensation of more gas than is evolved from the adsorbed condensables in the bed being heated and reduces the total circulating gas volume. These fluctuations in gas volume are accommodated by the conduit and surge chamber intermediate the conduit connecting the regeneration circuit and the conduit carrying raw feed gas to the bed in the sorption phase being exposed to the raw feed gas stream.

As the sorbent bed in the closed regeneration circuit begins to heat, the gas volume therein begins to increase because of expansion and the desorption of lighter hydrocarbons. The increased volume expands into the surge chamber displacing the gas present in the latter back into the feed gas line. The first portion of gas expanding from the regeneration circuit into the surge chamber may expand completely through the surge chamber and into the inlet feed gas line; however, this gas is relatively low in condensables and does not represent a recycle of any extensive quantities of vaporized condensables. As regeneration proceeds, heavier hydrocarbons are vaporized and expand into the surge chamber. The surge chamber is sized so that the richer gases do not expand completely back into the feed gas stream but remain in the surge chamber. Later in the regeneration step when the rate of liquid condensation of the heavier hydrocarbons exceed the vaporization rate of condensables from the adsorbed bed in the circuit, the richer gases present in the surge chamber are displaced by back-pressure from the feed gas line into the regeneration circuit and are reclaimed.

Although the net effect is one of volume expansion from the regeneration circuit back into the feed gas line, regeneration gas actually recycled to the feed gas line is of a lean composition, and the regeneration gas retained within the surge chamber and breathed back into the regeneration circuit is rich gas. Although some condensables may be recirculated, a substantial quantity of condensables which, in the absence of the surge chamber would also be recycled, are not recirculated.

A preferred embodiment of this invention is to utilize a surge chamber packed with a permeable particulated nonsorbent material such as glass or mineral fiber with a density of about 2 pounds per cubic foot so that the flow of gas into the surge chamber from the closed regeneration system occurs as an even piston-like, frontal displacement. The void volume in the surge chamber, that is the unoccupied pore space between the particles of packing material, is of sufficient capacity to accommodate a predetermined amount of gas expansion contemplated from the regeneration circuit. Because of the piston-like displacement into the surge chamber, little mixing occurs between the expanding gas from the regeneration circuit and the gas already present in the surge chamber.

Another preferred embodiment of this invention is a surge chamber in which baffles are mounted and disposed to inhibit turbulence and gas mixing.

In a more specific embodiment, this invention comprises a dry bed sorption hydrocarbon recovery system. The enriched gas in the regeneration phase is in a closed circuit which includes a cooler and a scrubber and is transferred by displacement from one regeneration train to another as required. The cooling circuit of the system is either open, semiclosed, or a combination of both and uses residue gas or inlet gas to cool a regenerated, heated adsorbent bed. The sorbent bed vessels are manifolded and connected by program controlled valves in such a manner that the main gas stream flows through a cool, active sorbent bed where water and heavy hydrocarbons are adsorbed and the remaining gas goes to the residue line. Simultaneously a second sorbent bed is being cooled, and a third bed is being regenerated. Periodically, the relative positions of the sorbent beds and the flow of gas in each of the beds is shifted so that each bed in succession is regenerated, cooled and then put in the sorption circuit.

This invention further provides method and apparatus whereby a portion of all of the regeneration gas in a hot, regenerated bed of solid sorbent is displaced by a gas to a bed of solid sorbent which already contains sufficient sorbed condensables from a previous sorption step to be considered "spent" and which is to be regenerated. The "spent" sorbent adsorbs additional condensables from the regeneration fluid before it enters the regeneration step.

For purposes of clarity in understanding our invention, the term "cycle" should be considered as including a sequence of operations in which simultaneously one bed adsorbs condensables from a raw inlet gas, a second bed is regenerated, and a third bed is cooled, and the beds subsequently are then switched by means of valves to different functions in a new cycle. A cycle also can include the additional step, which is called the "purging" or displacement step, wherein regeneration gas is displaced into the adsorbent bed which is about to be regenerated. Our method and apparatus can perhaps be more clearly understood if the purging step is considered to precede the adsorption, regeneration and cooling operations which proceed simultaneously in point of time.

Referring now to the figure, raw gas containing vapor to be removed is passed into the system by way of conduit 1 to one of adsorbers 4, 5 and 6; in this cycle, it will be assumed that absorber 6 is "on-stream" and conduit 2B is in service. During later cycles, conduits 2 and 2A serve to pass gas to adsorbers 4 and 5, respectively. Gas from which the vapor is removed by sorption is removed from adsorber 6 by way of conduit 7B and passed from the system by way of conduit 3. In later cycles, conduits 7A and 7 are used for the purpose of conduit 7B. This comprises the "on-stream" or treating portion of the system.

When an adsorber becomes "spent" or saturated with vapors, it must be regenerated as by passage therethrough of a heated gas to remove adsorbed vapors. The closed regeneration circuit will now be described. Heated gas is passed by way of conduits 8 and 9A to adsorber 5; conduits 9 and 9B serve a similar function in subsequent cycles with respect to adsorbers 4 and 6. This heated gas removes adsorbed material, and the resulting mixture passes by way of conduits 10A, 11 and 12 (and conduits 10, 11 and 12 or 10B, 11 and 12 during subsequent cycles) through conduit 13 to cooler 14, which conventionally can be a finned air cooler. The mixture then passes to gas cooler 15, which can be, for example, a shell and tube exchanger. Vapors contained in the gas are thus condensed, and are then phase separated in scrubber 16. Condensate is removed from scrubber 16 by way of conduit 17, and can be further separated to provide, e.g., natural gas liquid products. The cleansed gas passes by way of conduit 18, through a booster or circulating pump 19 and conduit 20 to heat exchanger 21 and is then passed by way of conduit 22 to heater 23. Heater 23 adds make-up heat to the gas, which is then ready for re-use for regeneration by way of conduit 8. A surge chamber 24 is connected by conduits 25 and 26 between the gas scrubber 16 and the inlet feed gas line 1. This comprises the regeneration circuit of the system.

When a sorbent bed has been regenerated by passage through it of hot gas, as just described, the sorbent is raised to a high temperature. Prior to again placing the bed on "on-steam" duty, the sorbent should be cooled for more efficient adsorption. Cool residue gas is passed by way of conduits 27 and 30 to the just-heated adsorbent bed, in this instance adsorber 4. Conduits 30A and 30B in subsequent cycles will be used to pass cool gas to adsorbers 5 and 6. The cool gas removes the heat from the absorbent in absorber 4, and is in turn heated itself. This heat is carried by the gas by way of conduits 28 and 29 through heat exchanger 21 to conduit 31. Conduits 29A or 29B with conduit 28 serve similar functions in subsequent cycles. It will be readily apparent that heat exchanger 21 provides a means for heat exchange to occur between gas in the heating and cooling circuits. The flow of cooling gas in conduit 31 can be routed in several ways. It can be returned to the residue gas line 3 through conduit 32, can be recycled to the cooling gas circuit through conduit 33, gas booster 34, conduit 35, and gas cooler 36 to conduit 27 or a combination of these. The cooling gas has been originally derived from the residue gas line 3 through conduit 41. This completes the description of the cooling circuit. As will be appreciated, each of the adsorbers 4–6 sequentially undergoes each of the above-described steps during a three-cycle period. The cycle steps described herein can be conveniently effected by manipulation of valves V–1 through V–20 or V–1 through V–23. The function of valves V–21, 22 and 23 are described subsequently.

At the end of the regeneration circuit of any adsorbent bed, the heated bed and piping are filled with rich gas from the hydrocarbon condensing system. A cool, active bed must be put into service. At the same time the spent bed is filled with lean gas. In order to preserve the integrity of the rich gas, it is necessary to displace the rich gas from the hot bed into the spent bed and simultaneously displacing the lean gas from the latter vessel. This is the "purge" or displacement step of the cycle and is an important step in the over-all recovery process. The basis for this step lies in the following considerations. The amount of each component of a hydrocarbon vapor mixture adsorbed by a sorbent at equilibrium is dependent in part upon the nature of the sorbent, the temperatures of the sorbent and hydrocarbon mixture and the partial pressure of each component in the hydrocarbon mixture. If the sorbent has reached equilibrium with a lean gas mixture, that is, a mixture containing only small quantities of heavier hydrocarbons, the sorbent is still capable of adsorbing additional quantities of heavier hydrocarbons from a vapor which is richer in these heavier components and in which the corresponding partial pressures are higher. Thus, for example, assume at the end of a regular cycle of simultaneous adsorption, regeneration and cooling steps, adsorber 5 is filled with rich gas and adsorber 6 is filled with a lean gas. Adsorber 4 must be put in service. In order to preserve the integrity of the rich gas in hot adsorber 5, it is necessary to displace the rich gas from adsorber 5 through heater 23 into cold adsorber 6, while simultaneously displacing the lean gas from adsorber 6.

When the rich regeneration gas (in the displacement step) passes into the staturated sorbent bed 6, it first will be cooled to the temperature of the bed 6 as it traverses a narrow section of the bed. The cooled rich gas then travels through the remainder of the bed 6 where it is largely stripped of its rich condensables.

During the displacing, or purge step, the cooling, condensing and collecting system (coolers 14 and 15 and scrubber 16) are isolated and bypassed by way of conduit 37. This can be done by closing valve 22 and opening valves 21 and 23. The displacement is continued until the transfer is just completed. At this point, when the displacing gas reaches the exit of the spent adsorber 6, the valves are switched to return the regeneration circuit to normal closed circuit operation. If the vessels and piping volumes are carefully matched, the lean gas reaches the exit of the hot adsorber 5 at the time the displacement is completed.

It is possible by operating in this manner to adsorb on the sorbent in the adsorber about to be heated additional quantities of condensable vapor over that adsorbed from the raw gas stream. This indirectly makes possible the use of sorbent beds smaller than would otherwise be possible to condense equal volumes of condensable vapors.

Before beginning the displacement step, it is usually desirable to discontinue cooling of the regenerated sorbent bed by closing inlet valve 7 to adsorber 4 so that any delay in the heating of adsorber 5 which is being regenerated is corrected. A temperature sensing element (now shown) in adsorber 5 can indicate when this adsorber body has been completely traversed by the heating front. The temperature sensing element may also be employed to control the next step of switching.

The above bed switch and displacement can be initiated by a temperature signal from the bed that has been heating, e.g. through the use of the temperature sensing element previously discussed. It is preferred that at the end of the displacement, the activation of the next valve sequence be initiated by a signal from a gas detector near the exit of the bed next to be regenerated which detects the rich gas front. This does not exclude time controlled valve sequence programs.

Table I indicates the manipulation of valves V–1 through V–23 through three complete cycles including two substeps of cooling, a closed circuit cooling and an open circuit cooling step.

TABLE I

| Adsorbent vessels | | | Valve Nos., V— | | | | | | | | | | | | | | | | | | | | | | |
|---|---|---|---|---|---|---|---|---|---|---|---|---|---|---|---|---|---|---|---|---|---|---|---|---|---|
| No. 4 | No. 5 | No. 6 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Cool. | Heat. | Ads. | C | C | O | C | O | C | O | C | C | O | C | C | C | O | C | C | O | O | C | C | O | C |
| Cool. | Heat. | Ads. | C | C | O | C | O | C | O | C | C | O | C | C | C | O | C | C | C | O | C | O | O | C |
| Ads. | Disp. | Disp. | O | C | C | C | C | O | C | O | C | C | C | C | C | O | C | O | C | O | O | O | C | O |
| Ads. | Cool. | Heat. | O | C | C | C | C | O | C | O | C | O | C | C | O | C | O | C | C | O | C | O | O | C |
| Ads. | Cool. | Heat. | O | C | C | C | C | O | C | O | C | C | O | C | O | C | C | C | O | C | O | C | O | C |
| Disp. | Ads. | Disp. | C | O | C | O | C | C | C | C | O | C | C | C | C | O | O | C | O | O | C | O | C | O |
| Heat. | Ads. | Cool. | C | O | C | O | C | C | C | C | O | C | C | O | C | C | C | O | C | O | C | O | C | O |
| Heat. | Ads. | Cool. | C | O | C | O | C | C | C | C | O | C | C | O | O | C | C | C | O | C | O | C | O | C |
| Disp. | Disp. | Ads. | C | C | C | O | C | O | O | C | C | C | C | C | O | C | C | C | O | O | C | O | C | O |

C=Valve closed, O=valve open, Ads.=Adsorbing, Disp.=displacement, Cool.=cooling, Heat.=heating.

The preceding sequence of process steps completes an adsorbing, heating and cooling cycle for each of the adsorbent vessels.

In the preceding example, the flow path during the displacement step follows the sequence in which rich gas from the hot regenerated bed 5 is displaced through the heater 23 into the cold spent bed 6 about to be regenerated, and correspondingly the gas in the cold spent bed is displaced to the residue gas line.

The flow path during the displacement step can be modified if desired by placing an incompletely cooled adsorbent bed in the sorption circuit and by flowing the effluent gas in heat exchange with gas in the heating circuit. In this modification the gas for the displacement step is drawn from the residue gas line downstream of the gas-to-gas heat exchanger and is displaced through the cooler 36 into the bed about to be cooled. Correspondingly, gas in the bed about to be heated is displaced. In this modification it should be noted that the cooler 15, separator 16 and circulating compressor are not bypassed during the displacement step. Heat exchange occurs between the heated gas coming from the bed in the sorption circuit and gas in the heating circuit. Conduit 37 and valve V-21 are not necessary if this second embodiment is followed for the displacement sequence.

Thus in the example previously discussed, during the displacement or purge phase, incompletely cooled adsorber 4 is placed on stream in the sorption circuit and the effluent gas therefrom is flowed through conduits 29, 28, 31, and 32, to residue gas line 3. Cooling gas is diverted from conduit 31 through conduit 33 to gas cooler 36 and by means of conduits 27 and 30A into hot adsorber 5. The hot gas in adsorber 5 is displaced through conduits 10A, 12, 13, coolers 14 and 15, scrubber 16, conduit 18, blower 19, conduit 20, heat exchanger 21 and conduit 22 to heater 23. Correspondingly gas from heater 23 flows through conduits 8 and 9B to adsorber 6 which is to be regenerated. Gas from adsorber 6 flows through conduit 7B to residue gas line 3. The valve sequence for this modification is presented in Table II.

EXAMPLE

Raw natural gas feed is processed by a system as shown in the accompanying figure. Adsorbers 4, 5, and 6 each spend about 18 minutes on adsorption, 18 minutes on reactivation, and 18 minutes being cooled. The system is switched from one cycle to the next responsive to measurement of the exit gas temperature of the adsorber being regenerated reaching 350° F. In addition, the cooling system is controlled by opening and closing valves V-20 and V-19 by use of timers, and V-21 responsive to measurement of the exit gas temperature in conduit 12. The switch from semiclosed circuit cooling to open circuit cooling is made approximately 12 minutes after the start of each cycle. Feed gas in conduit 1 is at about 90° F. and 550 p.s.i.a. in an amount of about 20,000 M c.f./day. Adsorber vessels 4, 5, and 6 each have a volume of 592 ft.$^3$ before bed fill is added, and operate at a pressure of about 550 p.s.i.a. Each adsorber contains about 16,000 pounds of activated carbon (8–12 mesh). Adsorbent temperature is about 120° F. during adsorption, a maximum of about 600 F. during regeneration, and is cooled to about 125° F. during the cooling phase. Residue gas in an amount of about 19,000 M c.f./day at about 175° F. and 540 p.s.i.a. is removed by way of conduit 3. Regeneration gas is circulated in conduit 8 in an amount of about 15,000 M c.f./day at about 630° F. and 560 p.s.i.a. Gas in conduit 13, coolers 14 and 15, has a temperature of about 100° F. Scrubber 16 operates at about 100° F. and 545 p.s.i.a. Raw liquid product is removed by way of conduit 17 in an amount of about 35,000 gal./day. Cool gas is flowed by way of conduit 22 to heater 23 at about 15,000 M c.f./day at 540 p.s.i.a. and 100° F. Surge chamber 24 has a volume of 332 ft.$^3$ before bed fill is added, and contains about 464 pounds of fiber glass, packed so as

TABLE II

| Adsorbent vessels | | | Valve Nos., V— | | | | | | | | | | | | | | | | | | |
|---|---|---|---|---|---|---|---|---|---|---|---|---|---|---|---|---|---|---|---|---|---|
| No. 4 | No. 5 | No. 6 | 1 | 2 | 3 | 4 | 5 | 6 | 7 | 8 | 9 | 10 | 11 | 12 | 13 | 14 | 15 | 16 | 17 | 18 | 19 | 20 |
| Cool. | Heat. | Ads. | C | C | O | C | O | C | O | C | C | O | C | C | C | O | C | C | C | O | O | C |
| Cool. | Heat. | Ads. | C | C | O | C | O | C | O | C | C | O | C | C | C | O | C | C | C | O | C | O |
| Ads. | Disp. | Disp. | O | C | C | C | C | O | C | O | C | C | C | C | C | O | C | C | O | C | O | C |
| Ads. | Cool. | Heat. | O | C | C | C | C | O | C | O | C | C | O | C | C | C | O | C | C | C | O | C |
| Ads. | Cool. | Heat. | O | C | C | C | C | O | C | O | C | C | O | C | C | C | O | O | C | C | C | O |
| Disp. | Ads. | Disp. | C | O | C | O | C | C | C | C | O | C | C | O | O | C | C | C | O | C | O | C |
| Heat. | Ads. | Cool. | C | O | C | O | C | C | C | C | O | C | C | O | O | C | C | C | O | C | O | C |
| Heat. | Ads. | Cool. | C | O | C | O | C | C | C | C | O | C | C | O | O | C | C | C | O | C | C | O |
| Disp. | Disp. | Ads. | C | C | O | C | O | C | O | C | C | C | C | O | O | C | C | C | O | C | O | O |

C=Valve closed, O=valve open, Ads.=adsorbing, Disp.=displacement, Cool.=cooling, Heat.=heating.

In the first of the two preceding embodiments the cooling and condensing train is bypassed. The second embodiment in which the cooling and condensing train are included in the displacement train is less desirable.

In the figure a flow rate controller is shown regulating the flow of gas in the regeneration circuit at 38 in proportion to the flow of incoming raw gas at 39. This is an advantageous arrangement for any of the systems described herein in that it can make the complete recovery system self responsive to the flow rate of the incoming raw gas. Variations in the incoming raw gas stream flow rate cause the flow rate in the regeneration circuit to vary in direct proportion. Other control elements can be tied into the regeneration circuit so that the entire recovery system can be keyed to the rate of raw gas flow into the system.

The following example will serve to further illustrate our invention.

to occupy about 332 ft.$^3$. Heater 23 is designed for a duty of 10 million B.t.u./hr.

Cooling gas is circulated through conduit 27 in an amount of about 22,000 M c.f./day and has an average temperature of 100° F. Hot gas flows by way of conduit 28 in an amount of about 22,000 M c.f./day and is at about 590° F. and 545 p.s.i.a. Cooled gas exits to residue conduit 3 by way of conduit 32 at about 175° F. and 540 p.s.i.a. Average compositions at various points throughout the system are tabulated below in mol percent:

| Conduit | Nitrogen | Methane | Ethane | Propane | Butanes | Pentanes | Hexanes Plus |
|---|---|---|---|---|---|---|---|
| 1 | 0.19 | 86.45 | 7.16 | 3.11 | 1.68 | 0.67 | 0.74 |
| 3 | 0.21 | 91.55 | 7.14 | 1.01 | 0.05 | 0.02 | 0.02 |
| 8 | | 69.9 | 10.8 | 14.4 | 4.1 | 0.7 | 0.1 |
| 17 | | 14.72 | 6.82 | 31.83 | 24.00 | 8.92 | 13.71 |

Although the figure illustrates a system using three beds, it will be obvious to those skilled in the art that the principle is applicable to systems using more or less than three sorption beds, for instance using two sorption beds, or even in a one-bed system on intermittent service. The words "sorption," "sorbent," etc., used herein are to connote the phenomena of adsorption and/or absorption. Although the system has been described for removing gasoline and/or water from natural gas, it applies broadly to removal of condensable vapor from gas, for example, moisture from instrument air lines.

Having thus described the invention by providing specific examples thereof, it is to be understood that no undue limitations or restrictions are to be drawn by reason thereof and that many variations and modifications are within the scope of the invention.

What is claimed is:

1. In apparatus for separating vaporized condensables from a feed gas said apparatus comprising:
   (a) a first bed of solid sorbent connected to a first conduit through which conduit a feed gas containing vaporized condensables is introduced into said first bed and said vaporized condensables sorbed therein, and
   (b) a closed circuit for regenerating a bed of solid sorbent containing sorbed vapors by circulating a regenerating gas therethrough, said circuit comprising respectively a second bed of solid sorbent, cooling means, separating means, and heating means, and second conduit means connecting same in closed recirculating communication, the improvement comprising a surge chamber connected by third conduit means between said closed circuit and said first gas conduit through which feed gas flows, said surge chamber being adapted to receive and dispense a gas volume from and into said closed circuit and being packed with a porous, permeable mineral fiber to reduce turbulence of gas volumes entering and leaving said chamber.

2. Apparatus of claim 1 wherein said mineral fiber has a bulk density of about 2 pounds per cubic foot.

3. Apparatus for separation of vaporized condensables from gas by cyclic sorption which comprises:
   (a) a plurality of vessels containing a solid sorbent;
   (b) a surge vessel adapted to receive and dispense a gas volume;
   (c) a source of gas containing vaporized condensables;
   (d) a point of utility for gas from which condensables have been removed;
   (e) a point of utility for condensed condensables;
   (f) a plurality of first conduit means communicating between said source of (c) and each of said vessels of (a);
   (g) a plurality of second conduit means communicating between said point of utility of (d) and each of said vessels of (a);
   (h) a regeneration circuit comprising:
      (1) heating means;
      (2) cooling means;
      (3) a plurality of third conduit means communicating between each of said vessels of (a) and said cooling means (2);
      (4) a gas-liquid separator;
      (5) fourth conduit means communicating between said cooling means (2) and said separator (4);
      (6) fifth conduit means communicating between said separator (4) and said point of utility (e);
      (7) a plurality of sixth conduit means communicating between said separator (4) and said heating means (1);
      (8) a plurality of seventh conduit means communicating between said heating means of (1) and said vessels of (a);
   (i) eighth conduit means interconnecting said surge vessel (b) between said first conduit means (f) and said regeneration circuit (h);
   (j) a source of cool gas;
   (k) a plurality of ninth conduit means communicating between said source of (j) and said vessels of (a);
   (l) a plurality of tenth conduit means communicating between each of said vessels of (a) and said point of utility (d); and
   (m) valve means in each of said plurality of first, second, third, seventh, ninth, and tenth conduit means of (f), (g), (3), (8), (k), and (l), respectively.

4. In the method of removing vaporized condensables from a feed gas stream by sorption of the condensables in a bed of solid sorbent wherein the bed of solid sorbent is regenerated by passing therethrough a heated regeneration gas stream in a closed circuit, the improvement which comprises:
   (a) passing a heated regeneration gas stream through the bed of solid sorbent;
   (b) cooling the regeneration gas stream passing from the bed of step (a) to effect condensing of condensables;
   (c) separating the condensed condensables of step (b);
   (d) heating the residue regeneration gas stream of step (c) to provide the heated regeneration gas stream of step (a);
   (e) providing a surge vessel adapted to receive and dispense a gas volume and communicating between said closed circuit of (b) and said feed gas of (d); and
   (f) displacing a portion of the regeneration gas into the surge vessel and subsequently returning at least a portion of said displaced regeneration gas from said surge vessel to the stream of regeneration gas.

5. In a process for the removal of vaporized condensables from a feed gas utilizing the contact of sorbent material with the feed gas with resultant sorption of vaporized condensables by the sorbent material and the subsequent treatment of the sorbent material with a heated regeneration gas to vaporize and remove the condensables and to thereby regenerate the sorbent material for further contact with the feed gas containing vaporized condensables, the improvement which comprises:
   (a) maintaining at least one bed of sorbent material in each of a plurality of zones;
   (b) continuously heating and recycling a flow of regeneration gas in a closed circuit through at least one of said beds of sorbent materials and through a cooling, condensing, collecting zone, to vaporize condensed condensables contained on the sorbent in said bed and to regenerate sorbent material in said bed;
   (c) continuously directing a cool gas through at least another one of said sorbent beds to cool said sorbent bed;
   (d) directing a flow of feed gas containing vaporized condensables through an additional one of said sorbent beds to remove condensables from said gas by sorption in said bed;
   (e) providing at least one surge vessel adapted to receive and dispense a gas volume and communicating between said closed circuit of (b) and said feed gas of (d); and
   (f) periodically shifting the relative positions of the sorbent beds, and the flow of gases in each of said beds so that each zone of step (a) becomes in succession a regeneration zone, a cooling zone, and a sorption zone;

whereby regeneration gas expands into said surge vessel during part of step (b) and is displaced from said surge vessel into said regeneration gas in a second part of step (b).

6. The method as set forth in claim 5 wherein after a bed being regenerated has become heated and prior to changing the relative positions of the beds to begin a new cycle, the regeneration gas present in the bed which has been heated is displaced to the sorbent bed which will be in the next closed regeneration cycle and simultaneously the gas present in the bed which has just completed sorption is displaced therefrom, whereby the vaporized condensables contained in said regeneration gas are conserved.

7. The method as set forth in claim 5 wherein said cooling, condensing, collecting zone is bypassed during the displacing of said regeneration gas.

8. The method of claim 5 wherein step (c) comprises:
(g) continuously cooling a gas;
(h) continuously directing the cool gas through at least one of said sorbent beds to cool said sorbent bed;
(i) recycling the gas from the sorbent bed of (h) to step (g);
(j) thereafter discontinuing the recycle of said gas of (i); and
(k) passing the gas leaving the sorbent bed of (h) from the process.

9. The method as set forth in claim 5 wherein after a bed being regenerated has become heated and prior to changing the relative positions of the beds to begin a new cycle:

(l) the flow of a feed gas of (d) is directed through the incompletely cooled sorbent bed of (b); and
(m) the flow of gas from said incompletely cooled sorbent bed of (l) is passed in indirect heat exchange with said regeneration gas stream of (b).

References Cited
UNITED STATES PATENTS

| | | | |
|---|---|---|---|
| 2,880,818 | 4/1959 | Dow | 55—62 |
| 3,129,078 | 4/1964 | Hobbs | 55—313 |
| 3,137,549 | 6/1964 | Kilgore et al. | 55—62 X |
| 3,378,992 | 4/1968 | Pierce et al. | 55—62 |

REUBEN FRIEDMAN, Primary Examiner

JOHN W. ADEE, Assistant Examiner

U.S. Cl. X.R.

55—180, 309